United States Patent [19]
Berstis

[11] Patent Number: 6,137,805
[45] Date of Patent: Oct. 24, 2000

[54] METHOD AND APPARATUS TO REMOTELY CONFIGURE A DATA PROCESSING SYSTEM

[75] Inventor: Viktors Berstis, Austin, Tex.

[73] Assignee: International Business Machines Corporation, Armonk, N.Y.

[21] Appl. No.: 08/797,074

[22] Filed: Feb. 10, 1997

[51] Int. Cl.[7] .................................................. H04L 12/54
[52] U.S. Cl. ........................................... 370/428; 709/220
[58] Field of Search .................................... 709/201, 203, 709/217, 219, 220, 221; 370/428

[56] References Cited

U.S. PATENT DOCUMENTS

| 4,814,972 | 3/1989 | Winter et al. | 364/200 |
| 5,155,847 | 10/1992 | Kirouac et al. | 395/200 |
| 5,222,134 | 6/1993 | Waite et al. | 380/4 |
| 5,276,731 | 1/1994 | Arbel et al. | 379/88 |
| 5,278,894 | 1/1994 | Shaw | 379/67 |
| 5,434,918 | 7/1995 | Kung et al. | 380/25 |
| 5,446,888 | 8/1995 | Pyne | 395/600 |
| 5,586,260 | 12/1996 | Hu | 395/200.2 |
| 5,671,354 | 9/1997 | Ito et al. | 395/187.01 |
| 5,684,950 | 11/1997 | Dare et al. | 395/187.01 |
| 5,706,427 | 1/1998 | Tabuki | 395/187.01 |
| 5,721,780 | 2/1998 | Ensor et al. | 380/25 |
| 5,841,970 | 11/1998 | Tabuki | 395/187.01 |
| 5,852,722 | 11/1998 | Hamilton | 395/200.51 |
| 6,012,088 | 1/2000 | Li et al. | 709/219 |
| 6,029,196 | 2/2000 | Lenz | 709/221 |

FOREIGN PATENT DOCUMENTS

| 0358292 | 3/1990 | European Pat. Off. | G06F 9/445 |
| 0358292 A2 | 3/1990 | European Pat. Off. | G06F 9/445 |
| 0717353AZ | 6/1996 | European Pat. Off. | G06F 9/44 |
| 0793170A1 | 9/1997 | European Pat. Off. | G06F 9/445 |
| 08340332 | 12/1996 | Japan | H04L 12/00 |
| 10155039 | 6/1998 | Japan | H04M 11/00 |
| 10171842 | 6/1998 | Japan | G06F 17/30 |
| 10198571 | 7/1998 | Japan | G06F 9/445 |
| WO98/26548 | 6/1998 | WIPO | H04L 29/06 |

OTHER PUBLICATIONS

Canada NewsWire, Internet Providers To Deliver New Local Phone Service Innovative New Call Control Features Meet The Needs of Internet Users, Jul. 24, 1996, pp. 1–2.
Technical Library, Remote Access Network Security, Dec. 6, 1996, pp. 1–9.
Remote LAN Access and Telecommuter Solutions, Security, Dec. 6, 1996, p. 1 of 1.
Netware Connect Services, NCS Security, Dec. 6, 1996, pp. 1–12.
Voice Announce, Talking Caller ID, Dec. 6, 1996, pp. 1–2.

Primary Examiner—Dang Ton
Assistant Examiner—Ken Vanderpuye
Attorney, Agent, or Firm—Jeffrey S. LaBaw; Duke W. Yee

[57] ABSTRACT

A method and apparatus for sending data from a first data processing system to a second data processing system in a distributed data processing system. A communications link is established between the first data processing system and the second data processing system, wherein the first data processing system receives identification information, such as caller identification information in the form of a telephone number and/or user name, as parts of the establishment of the communications link. Data associated with the first data processing system is identified using the identification information. In response to the identification of the data associated with the second data processing system, the data is transmitted to that data processing system.

14 Claims, 8 Drawing Sheets

METHOD AND APPARATUS TO REMOTELY CONFIGURE A DATA PROCESSING SYSTEM

BACKGROUND OF THE INVENTION

1. Technical Field

The present invention relates generally to an improved data processing system and, in particular, to an improved method and apparatus for configuring a data processing system. Still more particularly, the present invention relates to improved method and apparatus for remotely configuring a data processing system.

2. Description of the Related Art

References to the internet and the "information superhighway" are becoming pervasive on television and in newspapers. Advertisers are publishing http://www . . . addresses for all nature of commerce. The terms E-mail, electronic banking, and shopping from home are becoming familiar ideas to the average consumer.

As a result, a number of companies are developing systems for accessing the internet along with the WorldWide Web for the "average consumer" or for companies. In particular, the network computer (NC), also called a web PC, java terminal, internet access device, browser box, etc. are computers that discard overweight operating systems and bloated platform specific applications. Typically, the systems will run microkernal operating systems and platform independent software. In addition to being low cost stations for corporations, these systems are directed towards consumers who do not have the knowledge and/or resources to purchase a typical computer and install all the software needed to access the internet. For these types of consumers, the NC is being offered as an appliance that provides a convergence between the television, videocassette recorder, telephone, and computer, which is simple to use.

Even with NCs that are simple to use, most internet service providers still require the user to install the software and configure the software for the data processing system. After that, the consumer is often required to call the service provider's server and send registration information and establish passwords along with other user information. This added complexity defeats the purpose of having a simple data processing system for a consumer. It is profoundly discouraging to a consumer who has yet to program the clock on his VCR. Indeed, the consumer is apt to return the appliance rather than suffer through this process.

Therefore, it would be advantageous to have an improved method and apparatus for configuring a computer for use in a distributed data processing system.

SUMMARY OF THE INVENTION

It is one objective of the present invention to provide an improved data processing system.

It is another object of the present invention to provide an improved method and apparatus for configuring a data processing system.

It is yet another object of the present invention to provide an improved method and apparatus for remotely configuring a data processing system.

The foregoing objectives are achieved as follows. The present invention provides a method and apparatus for sending data from a first data processing system to a second data processing system in a distributed data processing system. A communications link is established between the first data processing system and the second data processing system, wherein the first data processing system receives identification information, such as caller identification information in the form of a telephone number and/or user name, as parts of the establishment of the communications link. Data associated with the first data processing system is identified using the caller identification information. In response to the identification of the data associated with the second data processing system, the data is transmitted to that data processing system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
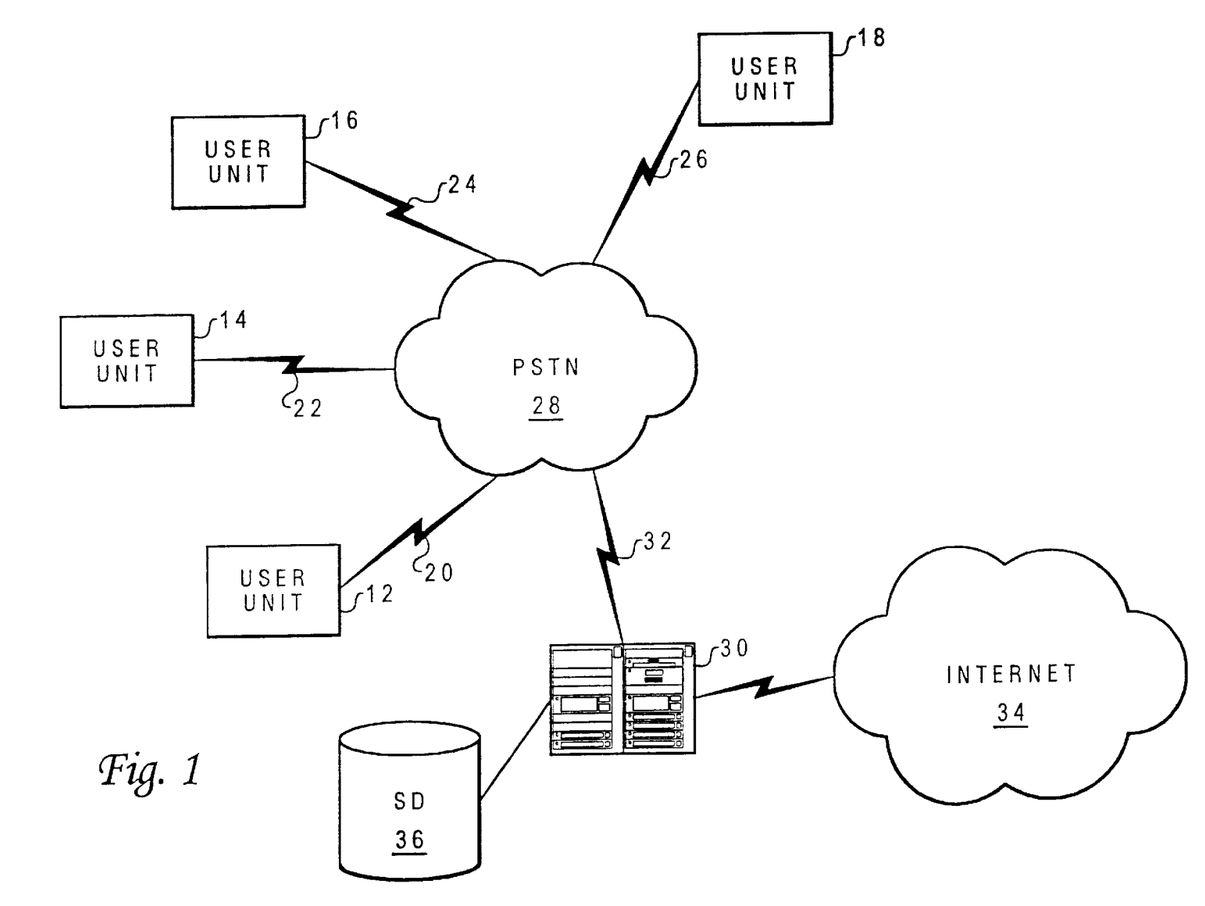
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted. User units 12, 14, 16 and 18 have communications links, 20, 22, 24 and 26 which provide these user units access to public switch telephone network (PSTN) 28. Through these communications links, the user units communicate with server 30, which is connected to PSTN 28 by communications link 32. Server 30 provides users 12–18 access to internet 34. In addition to providing users 12–18 access to internet 34, server 30 also stores various configuration information, passwords, E-mail messages, and backup data on storage device (SD) 36. User units 12–18 may be located in remote geographical locations, such as California or New York. Additionally, user units 12–18 may be located on other continents on the globe.

Figures 2A, 2D:
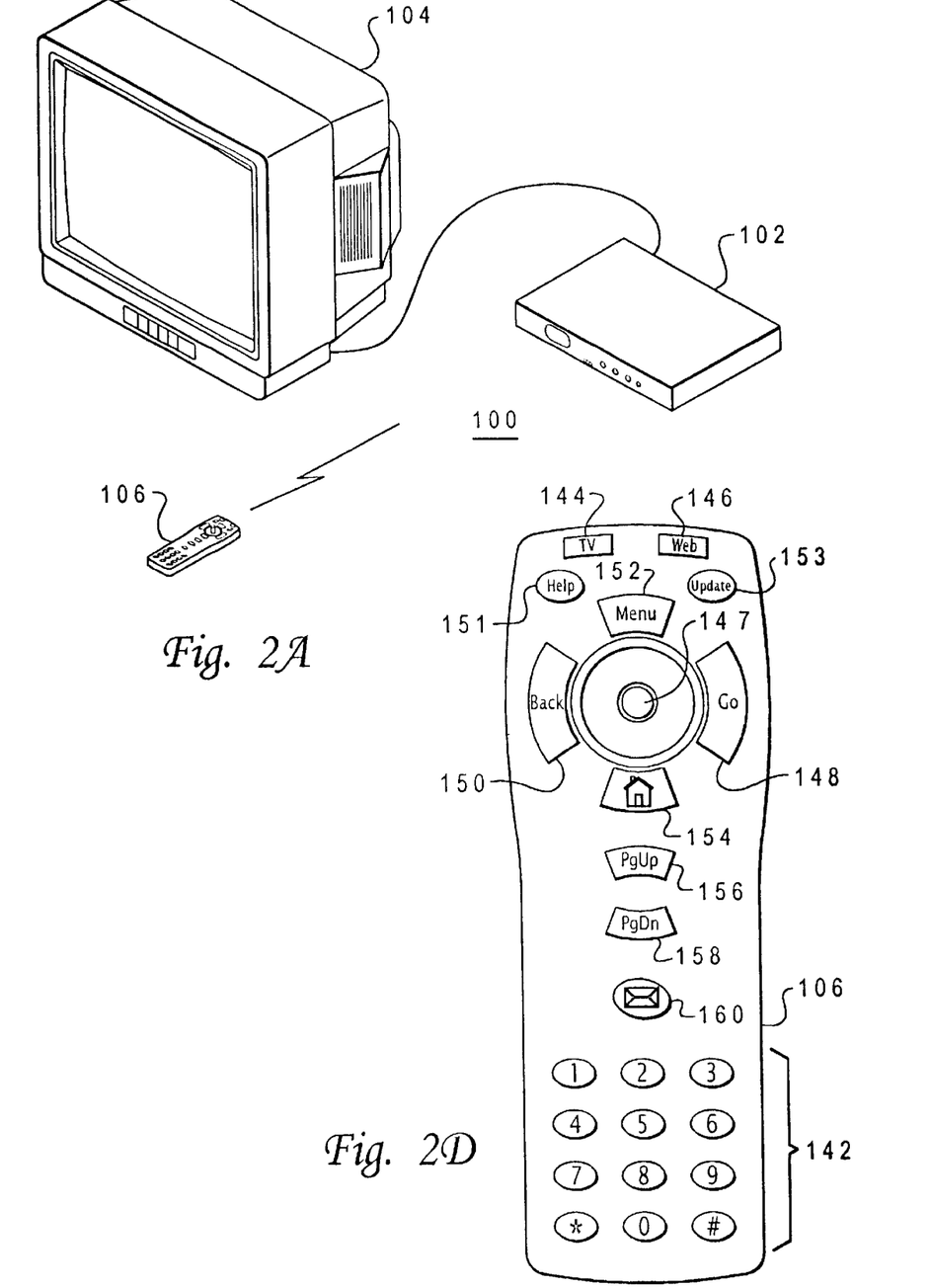
FIGS. 2A–2D depict various pictorial representations of a data processing system which may form a user unit according to the present invention.

With reference now to the figures, and in particular with reference to FIGS. 2A through 2D, various pictorial representations of a data processing system in which a preferred embodiment of the present invention may be implemented are depicted. FIG. 2A is a pictorial representation of the data processing system as a whole. Data processing system 100 in the depicted example provides, with minimal economic costs for hardware to the user, access to the Internet. Data processing system 100 includes a data processing unit 102.

Data processing unit 102 is preferably sized to fit in typical entertainment centers and provides all required functionality, conventionally found in personal computers, to enable a user to "browse" the Internet. Additionally, data processing unit 102 may provide other common functions such as, for example, serving as an answering machine, transmitting or receiving facsimile transmissions, or providing voice mail facilities.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

Figure 2B:
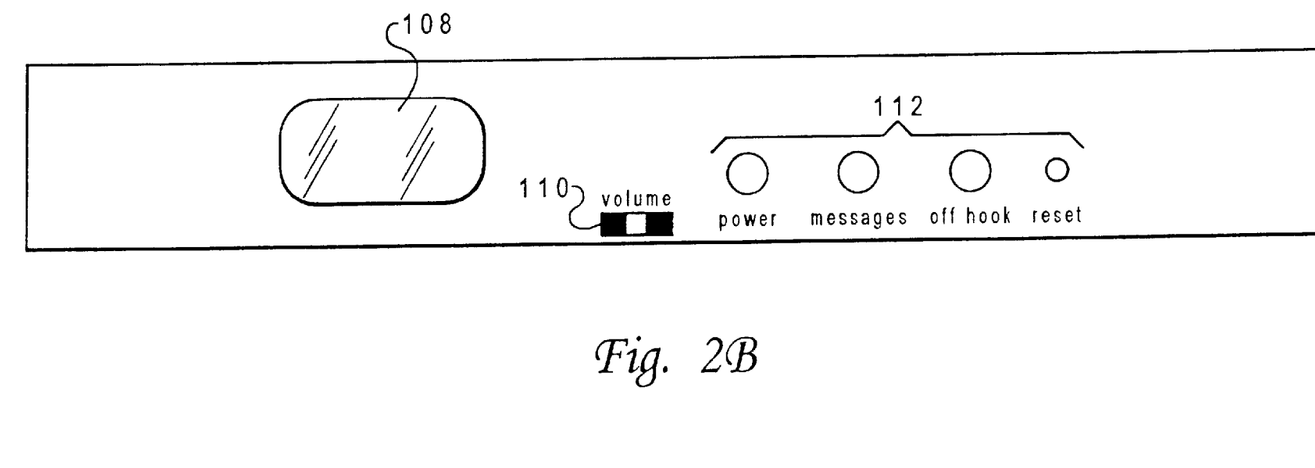

FIG. 2B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 2C:
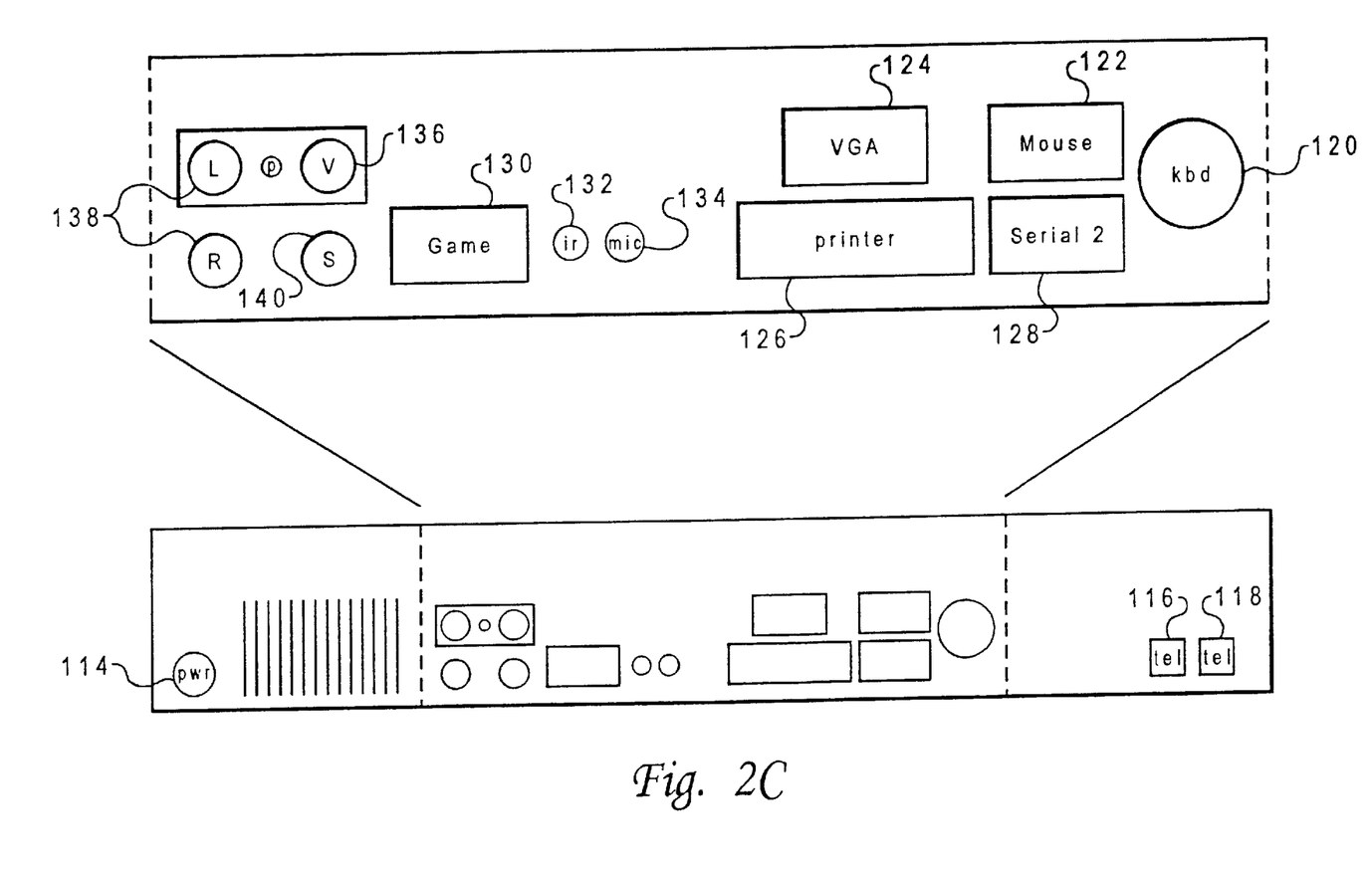

FIG. 2C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel ¾ modulator (not shown) may be connected in-line with the antenna connection.

FIG. 2D is a pictorial representation of remote control unit 106 in accordance with a preferred embodiment of the present invention. Similar to a standard telephone keypad, remote control unit 106 includes buttons 142 for arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. A pointing device, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Menu" button 152 causes a context-sensitive menu of options to be displayed, while home button 154 allows to user to return to a default display of options. "PgUp" and "PgDn" buttons 156 and 158 allows the user to change the content of the display in display-sized blocks rather than by scrolling. The message button 160 allows the user to retrieve messages. In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 3:
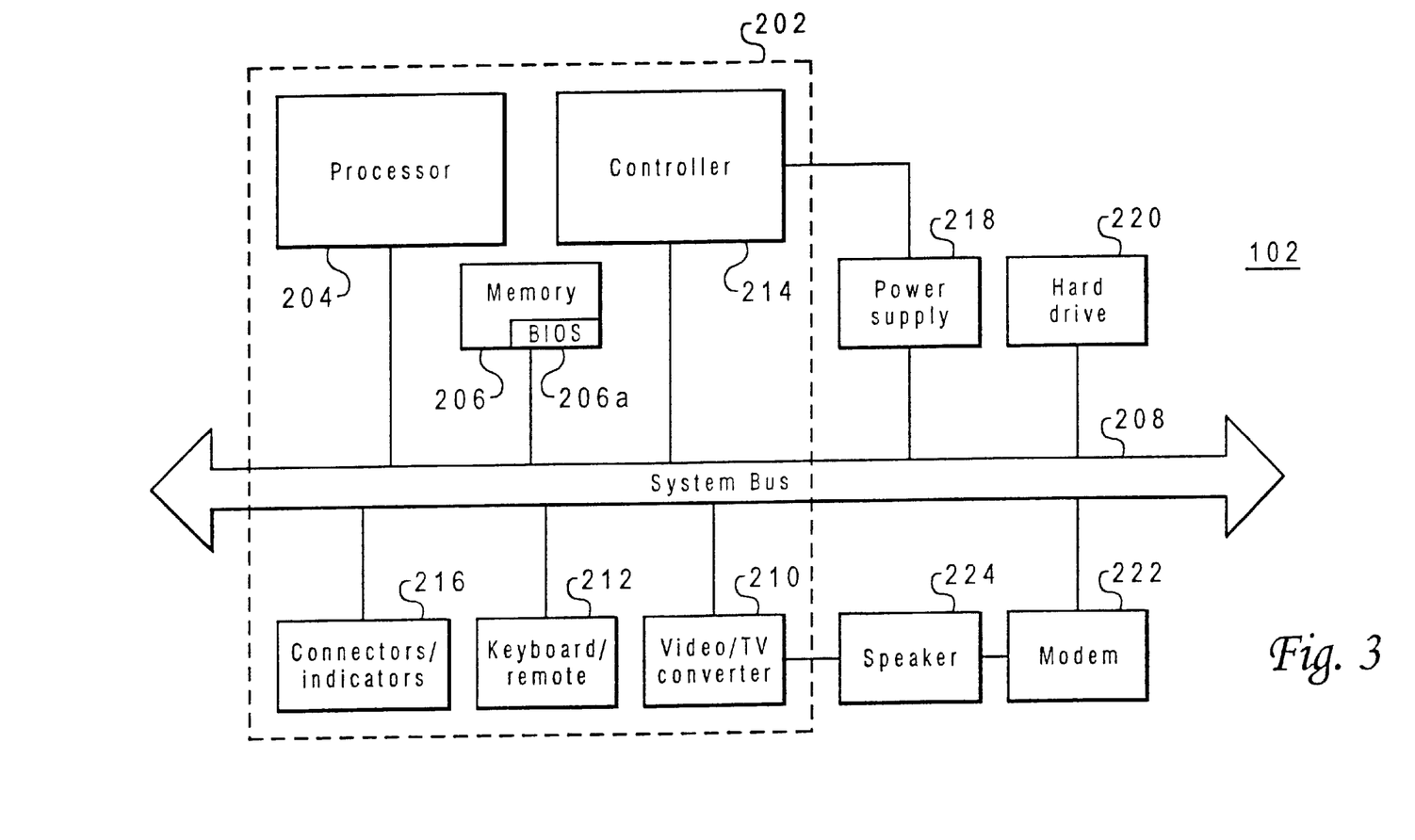
FIG. 3 is a block diagram for major components of a data processing unit as illustrated in FIGS. 2A–2D according to the present invention.

Referring now to FIG. 3, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 208. Processor 205 is preferably at least a 486 processor operating at or above 100 MHz. Memory 206 includes read only memory (ROM) 206a containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. The functionality of video/TV converter 210 may be provided utilizing commercially available video and converter chips. Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors/indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation in Armonk, N.Y.; Windows 3.1, a product Microsoft Corporation in Redmond, Wash.; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V.42bis, V34bis, V.34, V.17 Fax, MNP 1-5, and AT command sets. Hard drive 220 may also store data, such as a list of favorite internet sites or unviewed downloads from an internet site. Additionaly, hard drive 220 contains instructions necessary to establish a communications link with a service provider and initiate a configuration process for the data processing system.

Controller 214 is preferably one or more of the 805x family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shuts off data processing unit 102 and signals that service is required through indicators 216. Thus, data processing unit 102 is capable of self-recovery in some circumstances without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 2A–2D and 3 and described above may be varied for specific applications or embodiments. Such variations in which the present invention may be implemented are considered to be within the spirit and scope of the present invention.

Figure 4:
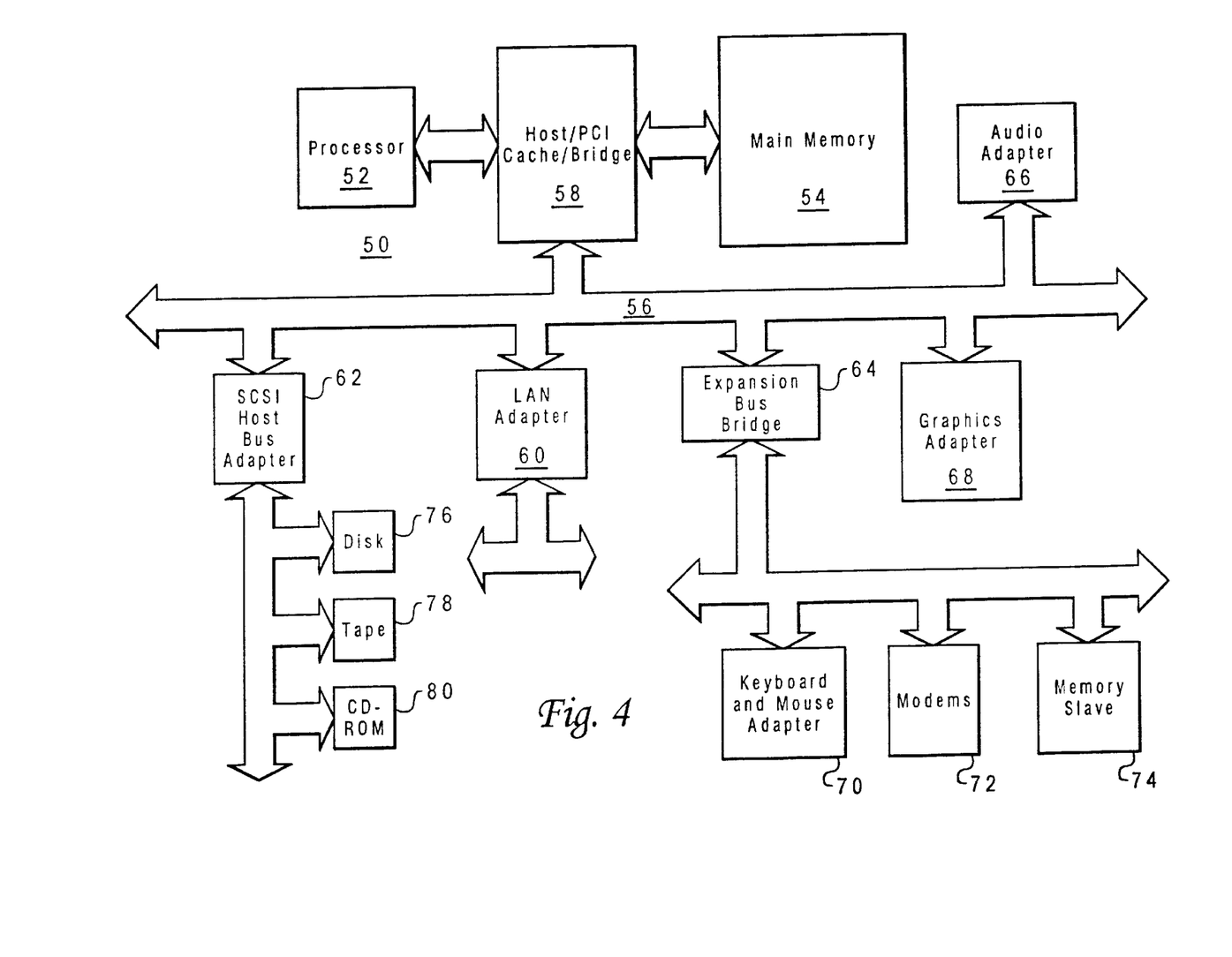
FIG. 4 depicts a block diagram of a data processing system which may be implemented as a server according to the present invention.

With reference now to FIG. 4, a block diagram of a data processing system which may be implemented as a server, such as server 30 in FIG. 1 is depicted according to the present invention. Data processing system 50 employs a peripheral component interconnect (PCI) local bus architecture. Processor 52 and main memory 54 are connected to PCI local bus 56 through PCI bridge 58. In the depicted example, PCI bridge 58 may include an integrated memory controller and cache memory. Additional connections to PCI local bus 56 may be made through direct component interconnection or through add-in boards. In the depicted example, local area network (LAN) adapter 60, SCSI 56 host bus adapter 62, and expansion bus interface 64 are connected to PCI local bus 56 by direct component connection, while audio adapter 66 and graphics adapter 68 are connected to PCI local bus 66 by add-in boards inserted in expansion slots. Expansion bus interface 64 provides a connection for keyboard and mouse adapter, modems 72, and memory slave 74. SCSI host bus adapter 62 provides a connection for disk 76, tape unit 78, and CD-ROM 80 in the depicted example. Alternatively, an IDE interface may be used in place of SCSI host bus adapter 62.

Typical PCI local bus implementations will support three or four PCI expansion slots or add-in connectors. The example depicted includes four loads on the mother board and three expansion slots. Communications links to PSTN 28 may be provided through modems 72 connected to PCI local bus 56 through an add-in board. Modems 72 also provide a connection to internet 34 in the depicted example.

Those of ordinary skill in the art will appreciate that the hardware depicted in FIG. 4 may vary. For example, other peripheral devices, such as optical disk drive and the like also may be used in addition or in place of the hardware depicted. The depicted example is not meant to imply architectural imitations with respect to the present invention. In the depicted example, the SCSI adapter 64 provides a connection to storage devices 36 as depicted in FIG. 1.

Figure 5:
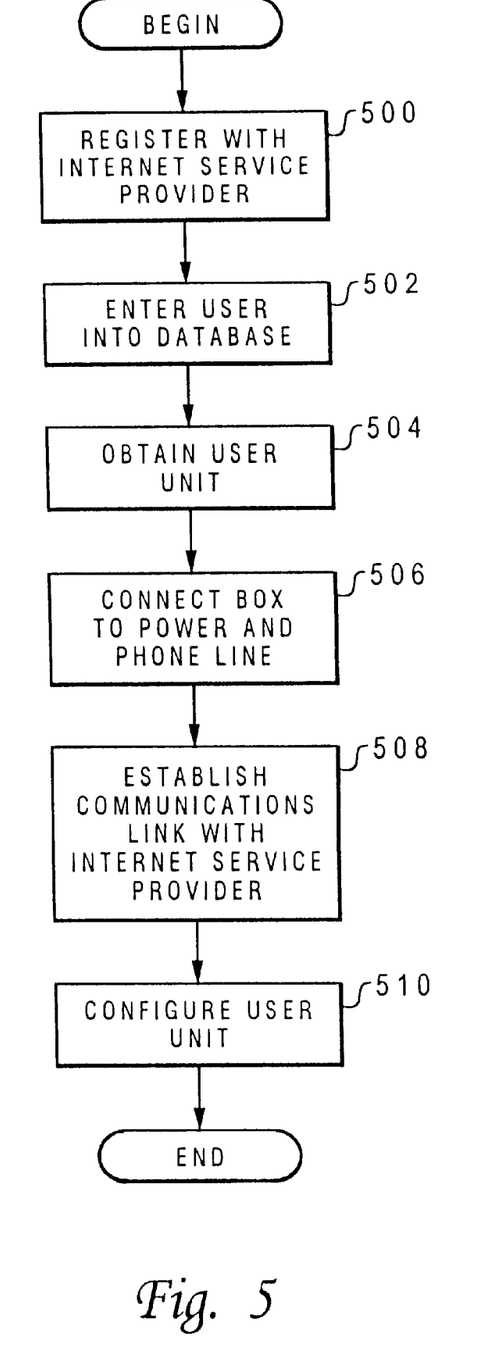
FIG. 5 is a flow chart of a process for registering a user unit with a server according to the present invention.

With reference now to FIG. 5, a flowchart of a process for registering a user unit with a server is depicted according to the present invention. The process begins by the user registering with the internet service provider (step 500). This registration may be done via telephone or by the user visiting a representative of the internet service provider. The user is entered into a database (step 502). A user unit is obtained by the user (step 504). The user unit may be obtained by the user unit being picked up by the user from the internet service provider or by the internet service provider shipping the user unit directly to the user. After receiving the user unit, the user connects the unit to a power source and a phone line, activating the unit (step 506).

Thereafter, upon turning on the user unit, a connection is made to the internet service provider (step 508). This communications link may be established automatically when the user turns on the user unit through an 800 number, with a local number being provided to the user as part of the configuration of the user unit. Upon establishing a communications link with the internet service provider, user unit is configured (step 510). More details on the configuration of the user unit is described below with reference to FIG. 6. Information is received from the server providing the internet service to the user automatically upon establishing a communications link with the internet service provider. Users are identified by the caller identification information that is received by the server when the user establishes a communications link. This caller identification information is provided by various telephone companies and provides a subscriber to this service an identification of the phone number from which the call is originating. Additionally, other information, such as the name of the person owning the phone number from which the call originates may be provided. This service is available from a number of different phone companies across the United States. In response to receiving the caller identification information, then the user may be identified within the database and configuration information may be transmitted to the user through the communications link.

Figure 6:
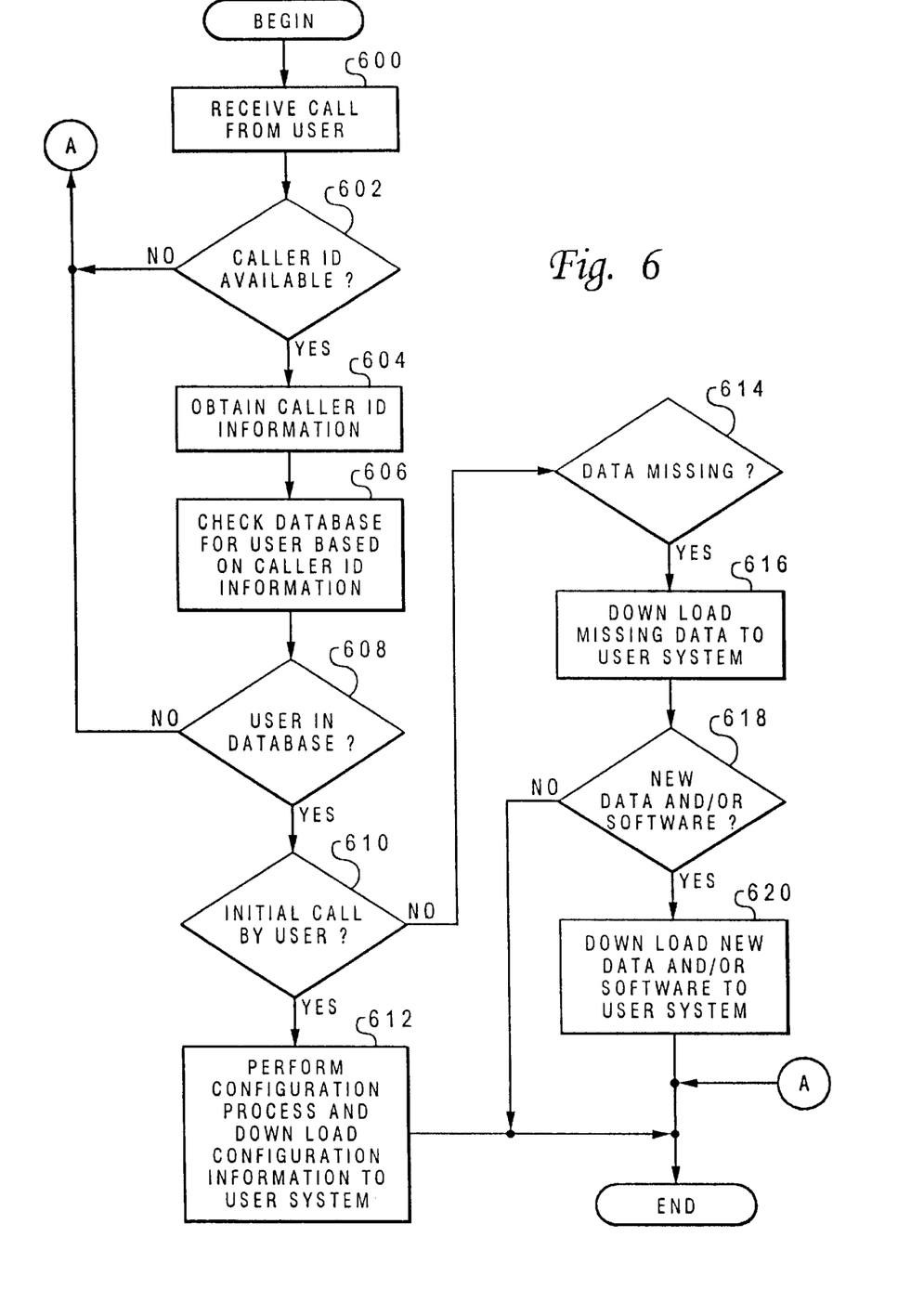
FIG. 6 is a flowchart of a process employed by server to automatically configure and update a user unit according to the present invention.

With reference now to FIG. 6, a flowchart of a process employed by a server to automatically configure and update a user unit according to the present invention. The process begins by receiving a call from a user unit (step 600). A determination is then made as to whether caller identification information is available (step 602). If caller identification information is not available, the process terminates. Otherwise, the process obtains the caller identification information (step 604). The database is then checked to determine whether the user unit has been registered with the server based on caller identification information (step 606). A determination is then made as to whether the user was found in the database (step 608). If the user is not found in the database, the process then terminates. As described above, the user is placed in the database when the user has registered for internet service from the provider in the depicted example. If the user is in the database, the process then determines whether this call is an initial call by the user (step 610). If the call is an initial call by the user, the process then performs a configuration process and downloads configuration information and other data to the user system (step 612). The configuration process includes procedures, such as, for example, prompting the user to select a local access number, selecting an ID, and setting up an account password. The configuration information and data includes information, such as account information necessary for the user to access the internet and other services provided by the server. For example, configuration information may include name and address information needed by the user unit to access the server. Additionally, an e-mail program and address may be set up if the user had selected an e-mail address when registering with the internet service provider. Moreover, if an update to software on the user system has been made after the user has obtained the user system or after the system was preloaded, such an update also may be made at this time. Thereafter, the process terminates.

With reference again to step 610, if the call by the user unit is not an initial call, then a determination is made as to whether data is missing from the user unit (step 614). In some instances, user data may be stored or backed up by the server. If data is missing, the server downloads the missing data (step 616). Additionally, in the instance that the user unit is defective and the user returns the unit to a repair center, the user in many instances will receive a new user unit that contains no data previously stored by the user. For example, address books and frequently visited sites would not be found on the new user unit. In such an instance, when the user calls the server, this data can be transmitted to the new user unit so that it can have the same configuration as the old. Next, a determination is made as to whether new configuration information or software is to be sent to the user unit. If no new configuration data or software is to be sent to the user unit, the process terminates. Otherwise, the new configuration information and/or software is downloaded to the user unit (step 618), with the process terminating thereafter.

Although in the depicted example, caller identification information provided by a telephone company is employed, other types of identification information may be employed to identify the user according to the present invention. For example, each user unit may include a unique identifier, such as a serial number stored in the user unit, which is associated with the user when the user registers and obtains the user unit from the service provider. Upon establishing a communications link, this unique identifier is transmitted to the server to identify the user to the server. In this manner, multiple user units may be identified within a single household that use the same telephone line. This serial number, being a unique identifier, can be used to detect counterfeits. For example, if the user unit is duplicated along with the serial number in the user unit, and a call is made to the service provider with that user unit, the service provider can identify that the user unit is being used at a different number or that two user units with the same serial number are establishing communications links with the server. Such an instance may warrant further investigation as to whether a counterfeit user unit is present.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

What is claimed is:

1. A method in a data processing system for configuring a remote data processing system comprising:

establishing a communications link through a network to the remote data processing system, wherein the communications link is initiated by the remote data processing system and wherein caller identification information is received from the network without requiring user input;

identifying configuration information for the remote data processing system using the caller identification information;

transmitting the configuration information to the remote data processing system; wherein the step of identifying configuration information further comprises:

identifying a user for the remote data processing system using the caller identification information;

determining whether the communications link is a first contact with the remote data processing system;

responsive to a determination that a first contact is present identifying configuration information for the first call;

responsive to a determination that a first contact is absent; identifying configuration information for the first call, determining whether data is missing from the remote data processing system; and responsive to a determination that data is missing from the data processing system, identifying the missing data as configuration information for transmission to the remote data processing system.

2. The method of claim 1, wherein the network includes a public switched telephone network.

3. The method of claim 2, wherein the caller identification information comprises a telephone number from which the remote data processing system is originating the communication link.

4. The method of claim 3, wherein the caller identification information further comprises a name of an owner of the telephone number.

5. The method of claim 1, wherein the configuration information includes at least one of a local access number, an account, a password, an email address, an email program, and an update to software.

6. The method of claim 1, wherein the caller identification information further includes a unique identifier transmitted to the data processing system from remote data processing system.

7. The method of claim 6, wherein the unique identifier is a serial associated the remote data processing system.

8. A data processing system for configuring a remote data processing system, the data processing system comprising:

establishing means for establishing a communications link through a network to the remote data processing system, wherein the communications link is initiated by the remote data processing system and wherein caller identification information is received from the network without requiring user input;

identifying means for identifying configuration information for the remote data processing system using the caller identification information;

transmitting means for transmitting the configuration information to the remote data processing system; wherein the identifying means further comprises:

first identifying means for identifying a user for the remote data processing system using the caller identification information;

determining means for determining whether the communications link is a first contact with the remote data processing system;

second identifying means, responsive to a determination that a first contact is present, for identifying configuration information for the first call;

third identifying means, responsive to a determination that a first contact is absent, for identifying configuration information for the first call, determining whether data is missing from the remote data processing system; and fourth identifying means, responsive to a determination that data is missing from the data processing system, for identifying the missing data as configuration information for transmission to the remote data processing system.

9. The data processing system of claim 8, wherein the network includes a public switched telephone network.

10. The data processing system of claim 9, wherein the caller identification information comprises a telephone number from which the remote data processing system is originating the communication link.

11. The data processing system of claim 10, wherein the caller identification information further comprises a name of an owner of the telephone number.

12. The data processing system of claim 8, wherein the configuration information includes at least one of a local access number, an account, a password, an email address, an email program, and an update to software.

13. The data processing system of claim 8, wherein the caller identification information further includes a unique identifier transmitted to the data processing system from remote data processing system.

14. The method of claim 13, wherein the unique identifier is a serial associated the remote data processing system.

* * * * *